UNITED STATES PATENT OFFICE.

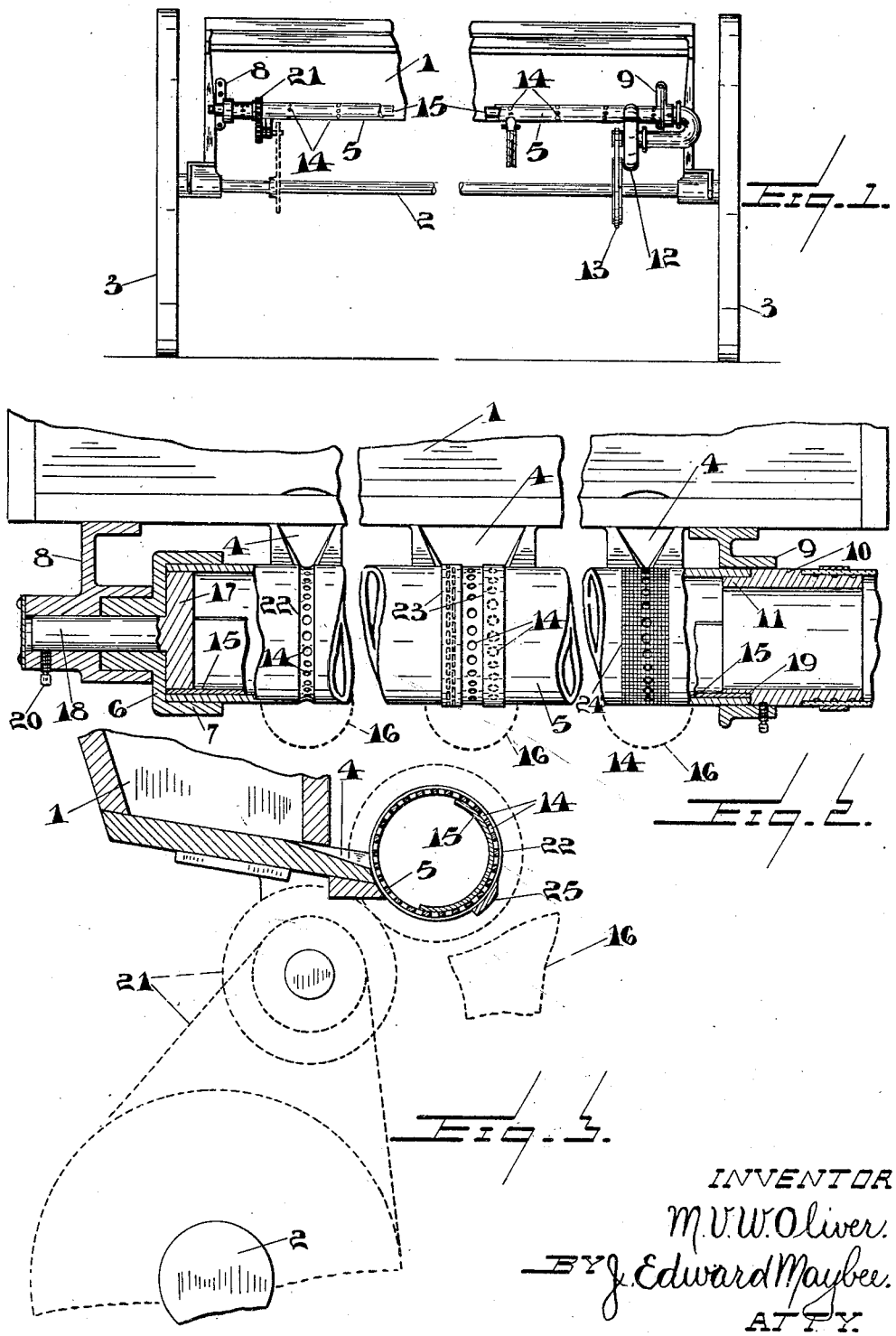

MELFORT V. W. OLIVER, OF TORONTO, ONTARIO, CANADA.

SEEDER.

1,371,517.  Specification of Letters Patent.  Patented Mar. 15, 1921.

Application filed February 10, 1920. Serial No. 357,754.

*To all whom it may concern:*

Be it known that I, MELFORT V. W. OLIVER, of the city of Toronto, in the county of York, Province of Ontario, Canada, have invented certain new and useful Improvements in Seeders, of which the following is a specification.

This invention relates to seed runs particularly adapted for use in seed drills such as used for sowing wheat, oats, barley, peas and the like as a field crop, and my object is to devise a seed run which may be adapted to supply seed to one or more seed cups as may be required, without the duplication of parts called for with the devices at present in use, and which will give a very even feed at any desired rate of flow.

I attain my object by means of the constructions hereinafter described and illustrated in the accompanying drawings in which—

Figure 1 is a rear view, partly broken away, of a seeder provided with my improvements;

Fig. 2 a plan view, partly broken away and partly in section, of my improved seed run; and Fig. 3 a cross section of the same showing also in dotted lines means for rotating the cylindrical feeder.

In the drawings like numerals of reference indicate corresponding parts in the different figures.

1 is the seed hopper of an ordinary grain drill mounted on the axle 2 carrying the wheels 3. The seed hopper is provided with a plurality of seed outlets 4, one for each drill to be supplied with seed. These seed outlets are preferably formed as short spouts, the rearward ends of which abut on a hollow cylindrical feeder 5. One end of this feeder has a cap 6 secured thereto provided with a hollow journal 7 having a bearing in the bracket 8, secured to the seed hopper. The other end of the feeder has a bearing in the bracket 9 secured to the feed hopper. A connection 10 for a suction hose is fitted into this bracket 9 in alinement with the feeder 5 and is preferably provided with an annular extension 11 fitting inside the end of the feeder 5. The suction pipe is connected with a suitably supported air pump 12, preferably of the rotary type and driven by suitable gearing 13 from the axle 2. The feeder is provided in alinement with each seed outlet with an annular series of openings 14 extending through the wall of the feeder. Through these openings the air pump tends to suck air. It is evident, however, that if the feeder be rotated while a slight vacuum is maintained therein, that individual seeds will be drawn against the apertures and held there as the feeder rotates. If therefore means are provided to cause the seed to fall away as soon as the feeder has been rotated sufficiently far to permit the seeds being discharged at the rear side of the feeder, a perfectly regular feed may be obtained at a rate which is dependent on the speed at which the feeder is rotated.

The preferred means to cause the dropping off of the seeds comprises a stationary shield 15, which is adapted to close the openings as they pass over it. The shield is preferably formed as a segment of a cylinder subtending an arc of about 180 degrees, which is placed inside the cylinder with its lower edge adjacent the lower sides of the seed outlets. The upper edge of the shield is located at such a point that any seeds which are shielded from the suction within the feeder tend to fall rearwardly to the seed cups 16 as indicated particularly in Fig. 3. This shield at one end is fitted on a disk 17, on which is formed a journal 18 extending through the hollow journal 7 and having a further bearing in the bracket 8, in which it is suitably held from rotation as for instance by the set screw 20. The other end will fit in a suitable rabbet 19 formed in the annular extension 11 as indicated particularly in Fig. 2.

The feeder is driven by suitable gearing 21 from the axle.

The openings 14 in the feeder may extend through the flush surface of the feeder, though for some purposes it may be preferable to form them at the bottom of an annular groove 22 as shown at the left hand side of Fig. 2.

If it be found desirable to have different sized openings for different seeds, a plurality of series of openings may be provided as shown in the center of Fig. 2, a sliding sleeve or sleeves 23 being provided whereby any one or more of the series of openings may be exposed for use. If grass seed is to be sown with the grain, the series of openings may be covered by fine wire netting as indicated at 24 as shown at the right hand side of Fig. 2, the fine openings in the netting picking up and carrying the grass seed. As an additional precaution a scraper 25 is provided as indicated in Fig. 3 adapted to scrape off any seed which does not fall freely after the suction has been cut off by the operation of the shield 15.

From the above description it will be seen that I have devised a seed run which will satisfactorily attain the objects of my invention as set forth in the preamble of the specification.

What I claim as my invention is:—

1. A seed run comprising a seed hopper having a seed outlet; a rotary tubular feeder fitted against said outlet and provided with an annular series of openings therethrough in alinement with said outlet; means for creating a slight vacuum in said feeder; and means for causing the subsequent falling off of seeds which by reason of the vacuum within the feeder have been caused to adhere over the openings therein.

2. A seed run constructed as set forth in claim 1 in which the means for causing the seeds to fall from the feeder comprises a stationary shield adapted to close the openings as they pass over it.

3. A seed run constructed as set forth in claim 1 in which the means for causing the seeds to fall from the feeder comprises a stationary shield adapted to close the openings as they pass over it and a stationary scraper edge fitted in close contact with the outer surface of the feeder.

4. A seed run construction as set forth in claim 1 in which the means for causing the seed to fall from the feeder comprises a semi-cylindrical shield, set within the feeder and positioned with its lower edge adjacent the lower side of the seed outlet.

5. A seed run constructed as set forth in claim 1 provided with a screen of fine mesh over the annular series of holes.

6. A seed run constructed as set forth in claim 1 provided with a plurality of series of holes close together and a sliding sleeve adapted to expose any desired series of holes.

7. A seed run comprising a seed hopper having a seed outlet; a rotary tubular feeder provided with an annular series of openings fitted with its ascending side against said outlet; means for creating a slight vacuum in said feeder; and means for causing the subsequent falling off at the descending side of the feeder, of seeds which by reason of the vacuum within the feeder have been caused to adhere over the openings therein.

Signed at Toronto, Canada, this 29th day of January 1920.

MELFORT V. W. OLIVER.